United States Patent [19]
Yamauchi

[11] Patent Number: 5,956,090
[45] Date of Patent: Sep. 21, 1999

[54] TELEVISION STANDARDS CONVERTER WITH TIME-CODE CONVERSION FUNCTION

[75] Inventor: Tatsuo Yamauchi, Tokyo, Japan

[73] Assignee: Oki Electric Industry Co., Ltd., Tokyo, Japan

[21] Appl. No.: 08/900,066

[22] Filed: Jul. 23, 1997

[30] Foreign Application Priority Data

Aug. 15, 1996 [JP] Japan ..................................... 8-215675

[51] Int. Cl.⁶ ............................... H04N 5/26; H04N 5/92
[52] U.S. Cl. ............................ 348/441; 348/459; 386/52; 386/62; 386/131
[58] Field of Search .................................... 348/441, 449, 348/473, 474, 475, 465, 459; 386/65, 52, 62, 64, 131, 29, 95; H04N 5/26, 5/92

[56] References Cited

U.S. PATENT DOCUMENTS

| | | | |
|---|---|---|---|
| 5,541,781 | 7/1996 | Barr | 386/66 |
| 5,644,675 | 7/1997 | Kaaden | 386/60 |
| 5,692,093 | 11/1997 | Iggulden | 386/46 |
| 5,701,153 | 12/1997 | Reicheck | 348/15 |
| 5,781,687 | 7/1998 | Parks | 386/52 |

FOREIGN PATENT DOCUMENTS

| | | | |
|---|---|---|---|
| 85306688 | 2/1986 | European Pat. Off. | ......... H04N 5/76 |
| 309597 | 12/1989 | Japan . | |
| 2 246 925 | 2/1992 | United Kingdom . | |

OTHER PUBLICATIONS

VTR Gijutsu (VTR Technology), Japan Broadcasting Corporation, Chapter 8, pp. 205–254.

*Primary Examiner*—John K. Peng
*Assistant Examiner*—Wesner Sajous
*Attorney, Agent, or Firm*—Rabin & Champagne,P.C.

[57] ABSTRACT

A standards converter converts an input video signal having time codes from a first television standard to a second television standard. The time codes are separated from the input video signal to obtain hours, minutes, and seconds values and input frame numbers. The hours, minutes, and seconds values are stored in a memory. Output frame numbers are generated in a consecutive sequence, from a first frame number to a last frame number, starting at times that are synchronized with the start of the sequence of input frame numbers. The output frame numbers are combined with the hours, minutes, and seconds values stored in the memory to generate output time codes, which are combined with the converted video signal.

10 Claims, 4 Drawing Sheets

TELEVISION STANDARDS CONVERTER WITH TIME-CODE CONVERSION FUNCTION

BACKGROUND OF THE INVENTION

The present invention relates to a standards converter that converts a video signal from one television standard to another television standard, more particularly to a standards converter that also converts time codes.

Time codes are digital codes that are commonly inserted in the vertical blanking interval of a video signal to specify the hour, minute, second, and frame number of each video frame. When video signals are edited electronically by use of video tape recorders, time codes are an invaluable aid, as they enable edit points to be easily and precisely located.

In the NTSC television system employed in the United States, the frame numbers in the time codes take on thirty consecutive values in a cycle that repeats substantially once per second. In the PAL and SECAM television systems employed in Europe, the frame numbers take on twenty-five consecutive values in a cycle that repeats exactly once per second. Incidentally, NTSC is an acronym for National Television System Committee, PAL is an acronym for Phase Alternating Line, and SECAM is a French acronym for Sequential Couleur avec Memoire. Time-code formats have been standardized by the Society of Motion Picture and Television Engineers (SMPTE) and the European Broadcasting Union (EBU).

Television standards include the above-mentioned NTSC, PAL, and SECAM standards, variants of these standards, and various proposed high-definition television (HDTV) standards. It is known technology to convert a video signal from one television standard to another by digitizing the video signal, storing the digitized signal in a memory with a capacity of at least two fields (one frame), and reading the stored signal from the memory under appropriate address control. Specifically, the address control system is adapted to skip or repeat lines and fields as necessary for conversion between differing frame rates and different numbers of scanning lines per frame.

A problem is that conventional conversion apparatus for this type of conversion does not digitize or store the vertical blanking interval of the video signal, so the time codes are lost in the conversion process, making the converted video signal difficult to edit. Moreover, even if the vertical blanking interval were to be digitized and stored, the converted video signal would still present editing problems because, owing to the repeating or skipping of fields, the frame numbers in the converted time codes would not run in the normal consecutive sequence: frame numbers would be skipped or repeated. The resulting inconsistency of the frame numbers would make accurate identification of edit points troublesome and difficult.

SUMMARY OF THE INVENTION

It is accordingly an object of the present invention to convert a video signal from one television standard to another without loss of time-code information.

A further object of the invention is to convert the time-code information so that frame numbers occur in the normal sequence in the converted signal.

A still further object is to control the conversion process so that repeating and skipping of fields take place consistently, always at the same frame numbers.

According to the present invention, when an input video signal having time codes indicating hours, minutes, seconds, and frames is converted from a first television standard to a second television standard, the time codes are separated from the input video signal to obtain hours, minutes, and seconds values and input frame numbers. The hours, minutes, and seconds values are stored in a memory once per input frame.

Output frame numbers are generated in a consecutive sequence, from a first frame number to a last frame number, substantially once per second. This process is controlled so that the consecutive sequence starts at a time responsive to the input frame numbers: for example, at the time when an initial frame number is detected among the input frame numbers.

The output frame numbers are combined with the hours, minutes, and seconds values stored in the memory to generate output time codes, which are combined with the converted video signal to produce an output video signal.

DETAILED DESCRIPTION OF THE INVENTION

Embodiments of the invention will be described with reference to the attached illustrative drawings.

Figure 1:
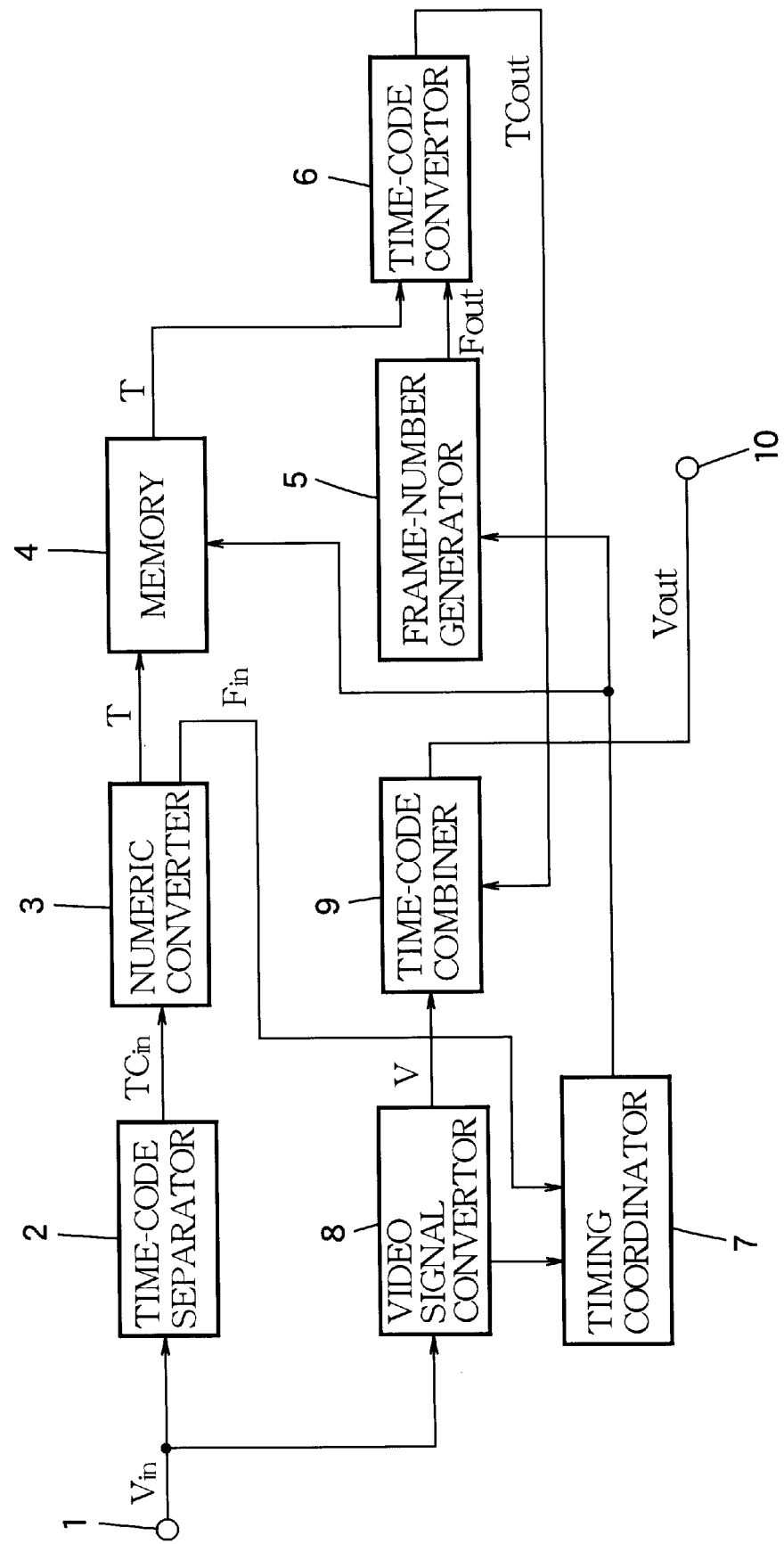
FIG. 1 is a block diagram of a first embodiment of the invention.
Figure 2:
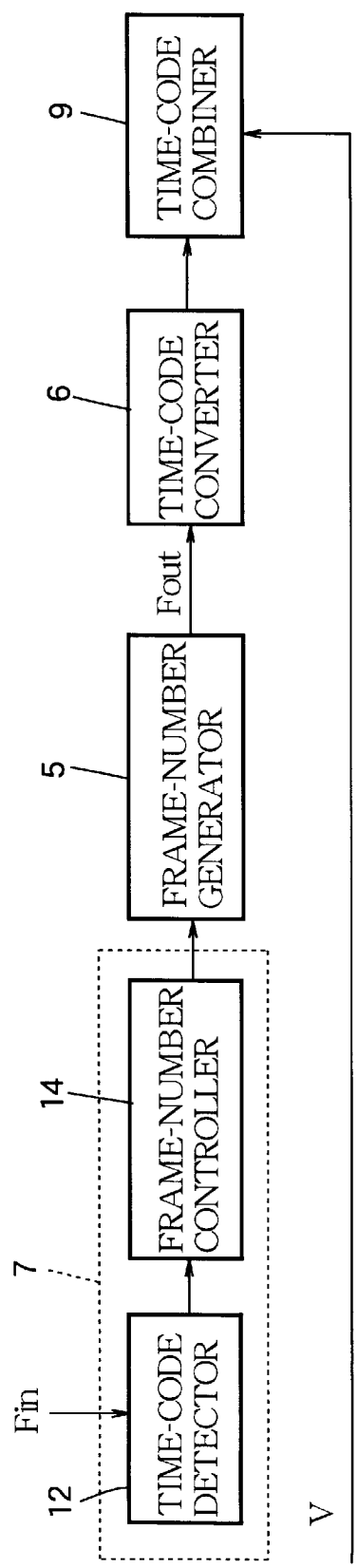
FIG. 2 is a more detailed block diagram of part of the first embodiment.

Referring to FIG. 1, a first embodiment comprises an input terminal 1, a time-code separator 2, a numeric converter 3, a memory 4, a frame-number generator 5, a time-code converter 6, a timing coordinator 7, a video signal converter 8, a time-code combiner 9, and an output terminal 10. Referring to FIG. 2, the timing coordinator 7 has a time-code detector 12, which receives input frame numbers $F_{in}$ from the numeric converter 3, and a frame-number controller 14, which supplies control signals to the frame-number generator 5. The timing coordinator 7 also has circuits, not explicitly shown in FIG. 2, for controlling the memory 4, and for synchronizing operations with the video signal converter 8.

The elements shown in FIGS. 1 and 2 comprise well-known electronic circuits such as memory and logic circuits and counters, detailed descriptions of which will be omitted so as not to obscure the invention with unnecessary detail.

Next, the operation of the first embodiment will be described for the case of conversion from NTSC to PAL.

Referring again to FIG. 1, the input video signal $V_{in}$ is supplied to both the time-code separator 2 and the video signal converter 8. The time-code separator 2 separates and demodulates the time codes, obtaining a bit stream of binary-coded information ($TC_{in}$) designating hours, minutes, seconds, and frames. The bit stream may include various other binary-coded information, such as the field mark, drop-frame flag, and cyclic redundancy check code specified in the SMPTE standard.

The numeric converter 3 converts this bit stream ($TC_{in}$) to a series of numeric values designating at least the hours, minutes, seconds, and frames values, and outputs at least the hours, minutes, and seconds values to the memory 4 as time information T. The timing coordinator 7 supplies write control signals to the memory 4 once per input frame, so that the time information in the memory 4 is updated once per input frame.

The numeric converter 3 supplies the frame numbers ($F_{in}$) obtained from the input time code to the timing coordinator 7. Referring to FIG. 2, the time-code detector 12 checks the $F_{in}$ values, looking for the point at which the frame numbers return from the final frame number (e.g. 30) to the initial frame number (e.g. 1). When the initial frame number is detected, which occurs substantially once per second, the time-code detector 12 notifies the frame-number controller 14.

The frame-number controller 14 controls the frame-number generator 5 so that the frame-number generator 5 generates output frame numbers $F_{out}$ in a repetitive cycle of twenty-five consecutive numbers, e.g. a cycle from one (1) to twenty-five (25), each cycle starting at the point at which the initial input frame number is detected by the time-code detector 12. The frame-number generator 5 is, for example, a read-only memory (ROM) in which the consecutive output frame numbers are stored at consecutive addresses, in which case the frame-number controller 14 controls the frame-number generator 5 by supplying address signals and output enable signals.

Each time the time-code converter 6 receives a new output frame number $F_{out}$ from the frame-number generator 5, the time-code converter 6 reads the current time value T stored in the memory 4, and combines this time value T with the frame number $F_{out}$ in an output time code $TC_{out}$. The time-code converter 6 also generates other time-code information as necessary, and encodes the output time code $TC_{out}$ in conformance with, for example, the EBU time-code specification.

The video signal converter 8 converts the video signal from NTSC to PAL format by the conventional method of storing the digitized video signal in a memory (not visible), and supplies the converted signal V to the time-code combiner 9. The video signal converter 8 also supplies synchronizing information to the timing coordinator 7, enabling the timing coordinator 7 to synchronize the output of time values T and frame numbers $F_{out}$ from the memory 4 and frame-number generator 5 with the output of converted frames from the video signal converter 8. The output of time codes $TC_{out}$ from the time-code converter 6 is synchronized with the output of converted fields from the video signal converter 8, so that time codes can be inserted into the vertical blanking interval before each field.

Figure 3:
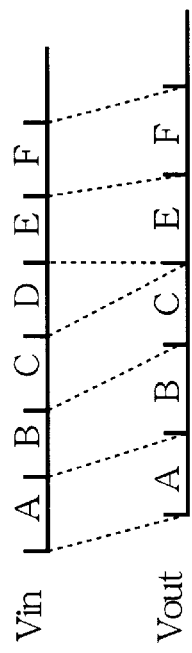
FIG. 3 illustrates conversion from thirty frames per second to twenty-five frames per second.

FIG. 3 illustrates the operation of the video signal converter 8 over a sequence of six input fields, indicated by the letters from A to F. In the output signal $V_{out}$, these become five fields, due to the lower frame rate. Basically, one of every six input fields, e.g. field D in FIG. 3, is skipped in the output signal. Of course, the video signal converter 8 also performs other conversion functions, such as conversion from the five hundred twenty-five (525) horizontal scanning lines of the NTSC system to the six hundred twenty-five (625) scanning lines of the PAL system.

The time-code combiner 9 writes the output time codes $TC_{out}$ into the appropriate horizontal scanning lines in the vertical blanking interval of the converted video signal V, and supplies the resulting output video signal $V_{out}$ to the output terminal 10.

Figure 4:
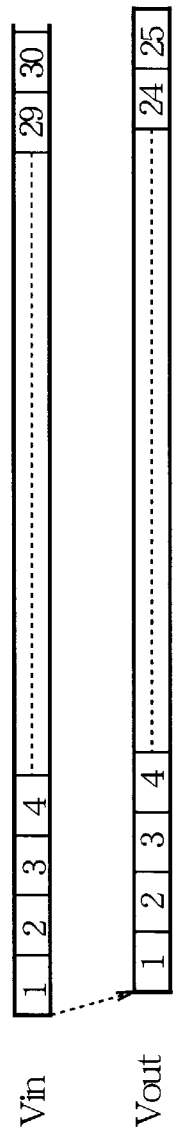
FIG. 4 illustrates the frame numbers produced by the first embodiment in conversion from thirty frames per second to twenty-five frames per second.

FIG. 4 indicates the alignment of frame numbers in the input and output video signals, showing a one-second segment of both signals. Both segments have the same time information T, and this time information T is constant throughout both one-second segments. Due to a conversion processing delay, the first frame (1) of the output signal $V_{out}$ starts after the first frame (1) of the input signal $V_{in}$, as shown by the dotted arrow, but this delay is absorbed by the storage of the time information T in the memory 4, so that consistency of the time information (hours, minutes, and seconds) is maintained between the input and output video signals.

The time codes in the output signal $V_{out}$ run in the normal consecutive sequence, e.g. from one (1) to twenty-five (25), with no repeated or skipped values. This sequence is also synchronized with the time information so that the frame numbers occur in order, e.g. starting from one (1) at the beginning of each second. Moreover, the time information is the same as in the input signal $V_{in}$. The output signal $V_{out}$ can therefore be edited by using the time codes in the normal way, with the same hour-minute-second time cues as in the input signal $V_{in}$, and without the problems of missing or repeated frame numbers.

Although the first embodiment has been described for the case of conversion from NTSC to PAL, the opposite conversion, from PAL to NTSC, can be performed in essentially the same way, e.g. by having the output frame numbers cycle from one to thirty while the input frame numbers cycle from one to twenty-five. In this case the video signal converter 8 repeats fields, instead of skipping fields, in order to generate thirty output frames per second from twenty-five input frames. If frame dropping is used to compensate for the slight difference between the actual NTSC frame rate (29.97 Hz) and a true thirty-frame-per-second rate (30 Hz), the time-code converter 6 can generate the necessary drop-frame flags in the time code.

Conversion between other television systems having different frame rates, such as between NTSC and SECAM, or between variants of the NTSC, PAL, and SECAM systems, is handled in the same way as described above. Conversion between these currently-used systems and HDTV systems is also possible.

The first embodiment solves the problem of time-code conversion when the output video signal $V_{out}$ is recorded on video tape, then edited later, but there still remains a problem if standards conversion is carried out simultaneously with the editing process. For precise editing control, the human operator needs to know exactly which fields will be skipped or repeated during standards conversion, but with conventional equipment this is not possible. As the source video tape is repeatedly started, stopped, and shuttled forward and backward during the editing process, the skipping or repeating of fields tends to occur at unpredictable frame numbers.

Figure 5:
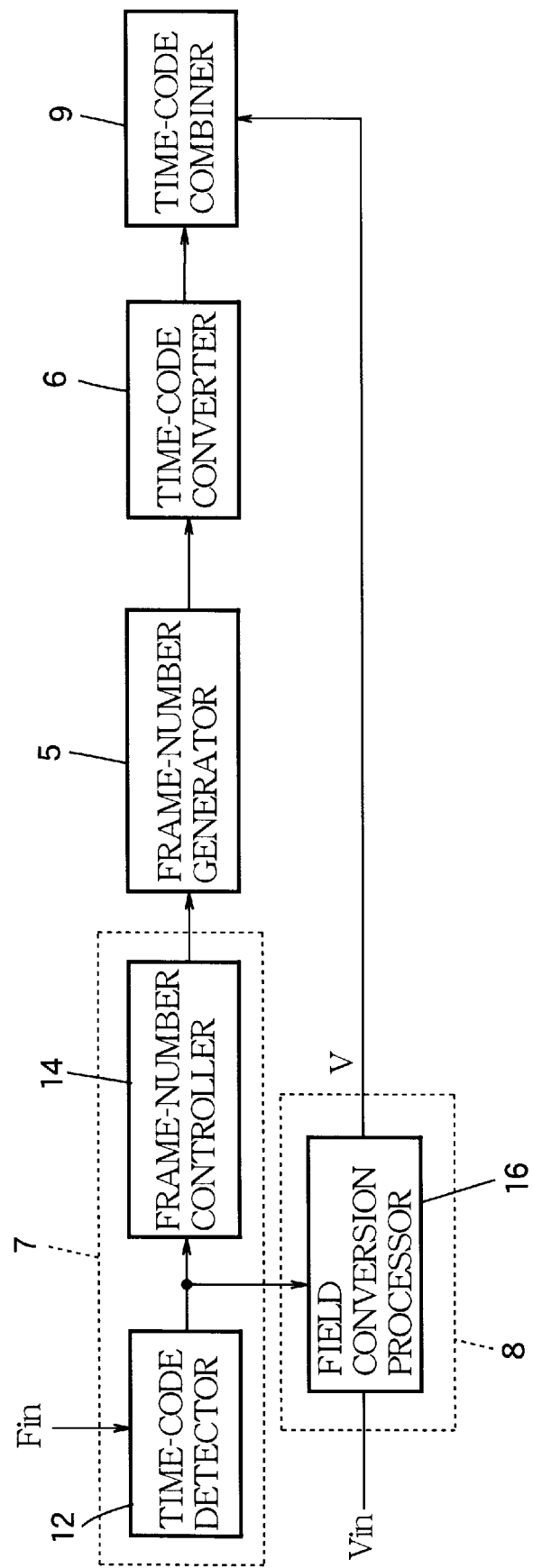
FIG. 5 is a block diagram of part of a second embodiment of the invention.

This problem is addressed by the second embodiment of the invention. Referring to FIG. 5, in the second embodiment, upon detecting the initial input frame number, the time-code detector 12 in the timing coordinator 7 notifies a field conversion processor 16 in the video signal converter 8, as well as the frame-number controller 14 in the timing coordinator 7. The field conversion processor 16 synchronizes the repeating and skipping of fields with this notification, so that the repeated or skipped fields always have certain fixed frame numbers.

Other aspects of the second embodiment are the same as in the first embodiment, except that the standards converter is now part of a video editing system that enables a human operator to edit out unwanted parts of the input video signal, rearrange the order of scenes, and perform other editing operations.

Figure 6:
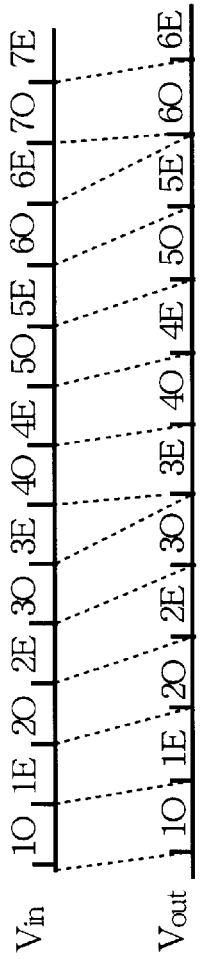
FIG. 6 illustrates conversion from thirty frames per second to twenty-five frames per second in the second embodiment.
Figure 7:
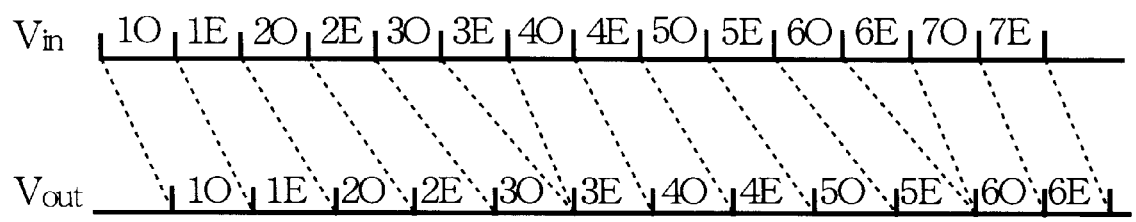
FIG. 7 illustrates another case of conversion from thirty frames per second to twenty-five frames per second in the second embodiment.

The operation of the second embodiment is illustrated schematically by FIGS. 6 and 7, for the case of conversion from the NTSC standard to the PAL standard. The field conversion processor 16 in the video signal converter 8 converts from thirty frames per second to twenty-five frames per second by skipping every sixth field of the input signal $V_{in}$. By synchronizing operations with the notification from the time-code detector 12, the field conversion processor 16 always skips the even (E) field in the third frame, the even field in the sixth frame, and in general the even field in every frame with a frame number divisible by three. The positions of the skipped fields in the output signal $V_{out}$ are also predictable, the skipped field occurring just before the even field in the third frame, the odd (O) field in the sixth frame, and so on.

This rule is adhered to regardless of any editing performed in the conversion process, and even if the different time bases of the input and output video signals cause the positions of the output frames to drift with respect to the input frames, as illustrated by the different positions in FIGS. 6 and 7. The human operator can accordingly edit the video signal with complete knowledge of the points at which fields will be repeated or skipped, an essential requirement for precise control of the editing process.

In order to skip or repeat fields in this way, according to the frame numbers of the field, the video signal converter 8 needs to store one more field than in conventional systems in which fields are skipped or repeated without regard to their frame numbers.

As a variation of the second embodiment, the time-code detector 12 can be adapted to notify the field conversion processor 16 not of the occurrence of the initial input frame number marking the beginning of each second of the time code, but rather of the occurrence of the specific frame numbers at which repeating and skipping are to be performed. Alternatively, all input frame numbers ($F_{in}$) can be supplied to the field conversion processor 16. This variation permits more precise editing when, for example, an edit-in point occurs in the middle of a second.

As the second embodiment illustrates, the present invention is useful in video editing equipment as well as in equipment that simply converts between different television standards. More generally, the present invention can be practiced in any type of video equipment in which standards conversion is carried out on video signals having time codes.

The present invention can also be used to repair time codes that have acquired erratic frame numbers from previous editing or conversion performed with conventional apparatus. In this case, no standards conversion need be performed; the converted video V signal output by the video signal converter 8 may be identical to the input video signal $V_{in}$.

Some video tape recorders record time codes in a longitudinal track, parallel to the edge of the video tape, instead of in the vertical blanking interval. That is, they employ a longitudinal time code (LTC) instead of a vertical-interval time code (VITC). The invention can be adapted to this practice, on the input side, by having the time-code separator 2 read the time code from the longitudinal track, or on the output side, by having the converted time code output to a recording head that records the time code on the appropriate longitudinal track.

Depending on the conversion processing delay in the video signal converter 8, the memory 4 can be adapted to store more than one time value (that is, more than one set of hour, minute, and second values), and the time-code detector 12 can be adapted to detect frame numbers other than the initial frame number.

Those skilled in the art will recognize that further variations are possible within the scope claimed below.

What is claimed is:

1. A method of converting an input video signal having time codes indicating hours, minutes, seconds, and frames from a first television standard to a second television standard, comprising the steps of:

separating the time codes from said input video signal, thereby obtaining hours, minutes, and seconds values and input frame numbers;

storing said hours, minutes, and seconds values in a memory once per frame of said input video signal;

generating a consecutive sequence of output frame numbers, from a first frame number to a last frame number, once per second, said consecutive sequence starting at a time responsive to said input frame numbers;

combining the hours, minutes, and seconds values stored in said memory with said output frame numbers to generate output time codes;

converting said input video signal from said first television standard to said second television standard, thereby obtaining a converted video signal; and combining said output time codes with said converted video signal.

2. The method of claim 1, further comprising the step of:
detecting an initial frame number in said input frame numbers, thereby determining when to start said consecutive sequence of output frame numbers.

3. The method of claim 1, further comprising the step of:
controlling the converting of said input video signal from said first television standard to said second television standard according to said input frame numbers, so that field skipping always occurs at certain fixed frame numbers.

4. The method of claim 1, further comprising the step of:
controlling the converting of said input video signal from said first television standard to said second television standard according to said input frame numbers, so that repeating of fields always occurs at certain fixed frame numbers.

5. A television standards converter for converting an input video signal having time codes indicating hours, minutes, seconds, and frames from a first television standard to a second television standard, comprising:

a numeric converter for obtaining hours, minutes, and seconds values and input frame numbers from said time codes;

a first memory coupled to said numeric converter, for storing the hours, minutes, and seconds values obtained by said numeric converter;

a frame-number generator for generating a consecutive sequence of output frame numbers, from a first frame number to a last frame number, once per second, said consecutive sequence starting at a time responsive to said input frame numbers;

a time-code converter coupled to said first memory and said frame-number generator, for combining the hours, minutes, and seconds values stored in said first memory with said output frame numbers to generate output time codes;

a video signal converter for converting said input video signal from said first television standard to said second television standard, thereby obtaining a converted video signal; and a time-code combiner coupled to said time-code converter and said video signal converter, for combining said output time codes with said converted video signal.

6. The apparatus of claim 5, wherein said frame-number generator comprises a second memory in which said consecutive sequence of output frame numbers is stored.

7. The apparatus of claim 5, further comprising:

a timing coordinator coupled to said frame-number generator, for controlling said first memory and said frame-number generator so that said hours, minutes, and seconds values are output from said first memory in synchronization with output of said converted video signal from said video signal converter and said output frame numbers are output from said frame-number generator in synchronization with output of said converted video signal from said video signal converter.

8. The apparatus of claim 7, wherein said timing coordinator comprises:

a time-code detector for detecting an initial frame number in said input frame numbers; and a frame-number controller for controlling said frame-number generator so that said consecutive sequence of output frame numbers starts in response to detection of said initial frame number by said time-code detector.

9. The apparatus of claim 8, wherein said time-code detector notifies said video signal converter of detection of said initial frame number, and in converting said input video signal from said first television standard to said second television standard, said video signal converter always skips fields having certain fixed input frame numbers, as determined from occurrence of said initial frame number.

10. The apparatus of claim 8, wherein said time-code detector notifies said video signal converter of said wraparound, and in converting said input video signal from said first television standard to said second television standard, said video signal converter always repeats fields having certain fixed input frame numbers, as determined from occurrence of said initial frame number.

* * * * *